US008185050B2

(12) United States Patent
Hirsch et al.

(10) Patent No.: US 8,185,050 B2
(45) Date of Patent: May 22, 2012

(54) COEXISTANCE DEVICE COMMUNICATION BETWEEN A BLUETOOTH DEVICE AND A WIRELESS LOCAL AREA NETWORK DEVICE

(75) Inventors: Olaf Hirsch, Sunnyvale, CA (US); Parag Garg, Sunnyvale, CA (US); Dominique Everaere, Antibes (FR)

(73) Assignee: NXP B.V., Eindhoven (NL)

( * ) Notice: Subject to any disclaimer, the term of this patent is extended or adjusted under 35 U.S.C. 154(b) by 258 days.

(21) Appl. No.: 12/373,042

(22) PCT Filed: Jul. 20, 2007

(86) PCT No.: PCT/IB2007/004547
§ 371 (c)(1),
(2), (4) Date: Nov. 4, 2009

(87) PCT Pub. No.: WO2008/132549
PCT Pub. Date: Nov. 6, 2008

(65) Prior Publication Data
US 2010/0056051 A1    Mar. 4, 2010

Related U.S. Application Data

(60) Provisional application No. 60/832,340, filed on Jul. 20, 2006.

(51) Int. Cl.
*H04B 7/00* (2006.01)

(52) U.S. Cl. ..... 455/41.2; 455/68; 455/67.11; 455/3.05; 455/90.2; 370/338

(58) Field of Classification Search ............... 455/41.2, 455/41.3, 68, 69, 67.11, 3.05, 90.2, 403; 370/338, 245, 908; 342/82, 98
See application file for complete search history.

(56) References Cited

U.S. PATENT DOCUMENTS

| | | | | |
|---|---|---|---|---|
| 2004/0242159 | A1* | 12/2004 | Calderon et al. | 455/63.3 |
| 2005/0192048 | A1* | 9/2005 | Bridgelall | 455/553.1 |
| 2006/0084383 | A1* | 4/2006 | Ibrahim et al. | 455/41.2 |
| 2006/0292986 | A1* | 12/2006 | Bitran et al. | 455/41.2 |
| 2007/0275662 | A1* | 11/2007 | Grushkevich | 455/41.2 |

FOREIGN PATENT DOCUMENTS

| | | |
|---|---|---|
| EP | 1199842 A2 | 4/2002 |
| EP | 1729463 A1 | 12/2006 |
| GB | 2412817 | * 10/2005 |

(Continued)

OTHER PUBLICATIONS

Hirsch, Olaf; "Coexistance Architecture Addendum, Project Gemini 3"; Aug. 21, 2008; Philips Semiconductors; Sunnyvale, USA.

*Primary Examiner* — Shaima Q Aminzay

(57) ABSTRACT

The present invention provides a system and a method for transferring data between a Bluetooth device (BTD) and a wireless local area network (WLAN) device which uses packet traffic arbitration (PTA). The method of the present invention includes encoding data using a plurality of control lines between the BTD and WLAN, transmitting the data and acknowledging the data reception using the existing control lines. The method according to the present invention allows BTD and WLAN device to transmit additional scheduling information, schedule the medium access, and reduce the number of collisions between the two devices.

16 Claims, 5 Drawing Sheets

FOREIGN PATENT DOCUMENTS

| | | |
|---|---|---|
| JP | 6139030 A | 5/1994 |
| JP | 6149431 A | 5/1994 |
| JP | 7240768 A | 9/1995 |
| JP | 2001324965 | 11/2001 |
| JP | 2001324965 A | 11/2001 |
| JP | 2006139030 | 6/2006 |
| JP | 2006149431 | 6/2006 |
| JP | 2007240768 | 9/2007 |
| WO | 2004023747 A2 | 3/2004 |
| WO | 2004045092 A1 | 5/2004 |
| WO | 2005122431 A1 | 12/2005 |
| WO | 2007002688 A2 | 1/2007 |

* cited by examiner

COEXISTANCE DEVICE COMMUNICATION BETWEEN A BLUETOOTH DEVICE AND A WIRELESS LOCAL AREA NETWORK DEVICE

FIELD OF THE INVENTION

The present invention generally relates to wireless communication, and more specifically relates to the data transfer between a collocated Bluetooth device (BTD) and a wireless local area network (WLAN) device.

BACKGROUND

In today's world the use of wireless personal area networks (WPANs) has been gaining popularity because of the flexibility and convenience in connectivity they provide. WPAN systems, such as those based on Bluetooth technology, provides wireless connectivity to peripheral devices and/or mobile terminals by providing short distance wireless links that allow connectivity within a specific distance (10-meter range). In contrast to WPAN systems, wireless local area networks (WLANs) provide connectivity to devices that are located within a slightly larger geographical area, such as the area covered by a building or a campus, for example. WLAN systems are typically based on IEEE 802.11 standard specifications, typically operate within a 100-meter range, and are generally utilized to supplement the communication capacity provided by traditional wired local area networks (LANs) installed in the same geographic area as the WLAN system. In some instances, WLAN systems may be operated in conjunction with WPAN systems to provide users with an enhanced overall functionality.

When operating a Bluetooth device (BTD) and a WLAN device in, for example, a wireless device, at two different types of interference effects may occur. One interference effect happens because the Bluetooth devices and WLAN devices transmit on the same or overlapping frequencies.

The second effect occurs if the transceiver of a Bluetooth device is in close proximity to the transceiver of a WLAN device as it is the case in mobile phones or personal digital assistants (PDA). In this instance the transmitter of one device overloads the receiver of the other device and the receiver is not able to receive any signals independent of whether the Bluetooth device and WLAN device use the same frequencies.

The collocation interferences are solved using packet traffic arbitration (PTA) technique. The solution requires physical connections between the BTD and WLAN device as well as software modifications. To accommodate different receive/transmit scenarios, a total of four control signals are set up between the BTD and WLAN device. The control signals include a Bluetooth line (BT line), a wireless local area network line (WL line), a wireless local area network receive indicator line (RXIND line), and a priority line (PRI line). BT line and WL line are basic arbitration signals from BTD and WLAN device respectively. PRI line is a Bluetooth priority indicator for very important traffic.

These control lines between the BTD and WLAN device provide very limited amount of information to efficiently arbitrate the medium access between BTD and WLAN device and also the do not provide information such as connection type and type of link of communication (asynchronous connection-less (ACL) link, synchronous connection oriented (SCO) link or enhanced synchronous connection oriented (eSCO) link). Also BTD or WLAN device do not know the time period for which the other device needs the medium and for what purpose. This lack of knowledge leads to sub-optimal scheduling of the medium access for BTD and WLAN device. The BTD and WLAN device are connected to a host system (main processor or micro controller) and some of the data transfer between the BTD and WLAN device occurs through the host system. In case of time critical data, the data transfer through the host system takes too much time.

Hence, it would be advantageous to provide a method and a system for transferring data between the collocated BTD and WLAN device through the existing control lines between the two devices. The present invention has been developed to meet these needs in the art.

SUMMARY OF THE INVENTION

The present invention provides a system and a method for transferring data between a Bluetooth device (BTD) and a wireless local area network (WLAN) device which uses packet traffic arbitration (PTA). The method of the present invention includes encoding data using a plurality of control lines between the BTD and WLAN device, transmitting the data, and acknowledging the data reception using the existing control lines. The method according to the present invention allows BTD and WLAN device to transmit additional scheduling information, schedule the medium access, and reduce the number of collisions between the two devices.

In an example embodiment of the present invention, a method for transferring data between a collocated BTD and a WLAN device is provided. The method includes the steps of encoding data using a plurality of control lines between the BTD and WLAN device, transmitting the data from the BTD to the WLAN device, and acknowledging data reception by the WLAN device using another control line between the BTD and the WLAN device. The plurality of control lines used for encoding data includes a priority line (PRI line) and a Bluetooth line (BT line). The WLAN device uses a wireless local area network line (WL line) to acknowledge the data reception. After the data is sent to the WLAN device, the BTD raises the PRI line before the start of next Bluetooth frame.

In another example embodiment of the present invention, a method for transferring data between a collocated BTD and a WLAN device is provided. The method includes the steps of encoding data using a plurality of control lines between the BTD and WLAN device, transmitting data from the WLAN device to the BTD, and acknowledging data reception by the BTD using another control line between the BTD and the WLAN device. The plurality of control lines used for encoding data includes a wireless local area network receive indicator line (RXIND line) and WL line. The WLAN device uses BT line to acknowledge the data reception.

In another example embodiment of the present invention, a system is provided for transferring data in wireless communication. The system includes a BTD collocated with a WLAN device for enabling the wireless communication, an interface between the BTD and WLAN device, where the interface includes a plurality of control lines between the BTD and WLAN device, a data encoding state machine for encoding and transmitting the data using the plurality of control lines, and another control line within the plurality of control lines for acknowledging a data reception between the Bluetooth device and wireless local area network device. When the data transfer occurs from BTD to WLAN device, PRI line and BT line are used to encode the data, and data reception is acknowledged from the WLAN device using WL line. When the data transfer occurs from WLAN device to the BTD, RXIND line and WL line are used to encode the data, and data reception is acknowledged from the BTD using BT line.

The above summary of the present invention is not intended to represent each disclosed embodiment, or every aspect, of the present invention. Other aspects and example embodiments are provided in the figures and the detailed description that follows.

BRIEF DESCRIPTION OF THE DRAWINGS

The invention may be more completely understood in consideration of the following detailed description of various embodiments of the invention in connection with the accompanying drawings, in which.

Figure 1A:
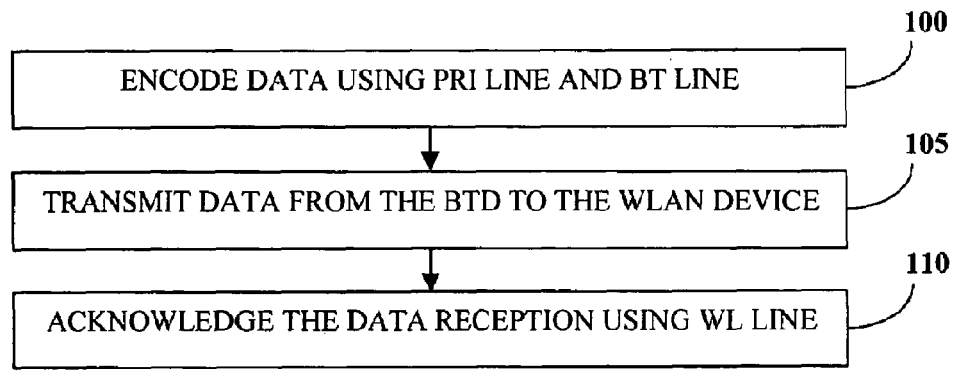
FIG. 1A is a flow diagram illustrating the method of transferring data from a collocated BTD to a WLAN device according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

FIG. 1A is a flow diagram illustrating the method of transferring data from the collocated BTD to the WLAN device according to an example embodiment of the present invention. The PTA data protocol for transferring data from BTD to the WLAN device is explained as follows. The PTA data protocol transmits data during the PRI period from the BTD to the WLAN device. In a step 100, the data is encoded using the PRI line and BT line. A step 105 transmits the data from the BTD to the WLAN device. In a step 110, the WLAN device acknowledges the data reception using WL line. The PRI line and BT line undergoes at least one state transition for each data bit of the data sent to the WLAN device. After the data bits are sent to the WLAN device, the BTD raises the PRI line before the start of next Bluetooth frame. This method allows the transmission of additional information over the existing control lines between the BTD and WLAN device. This information allows BTD and WLAN device to efficiently schedule the medium access and reduce the number of collisions between the two devices.

Figure 1B:
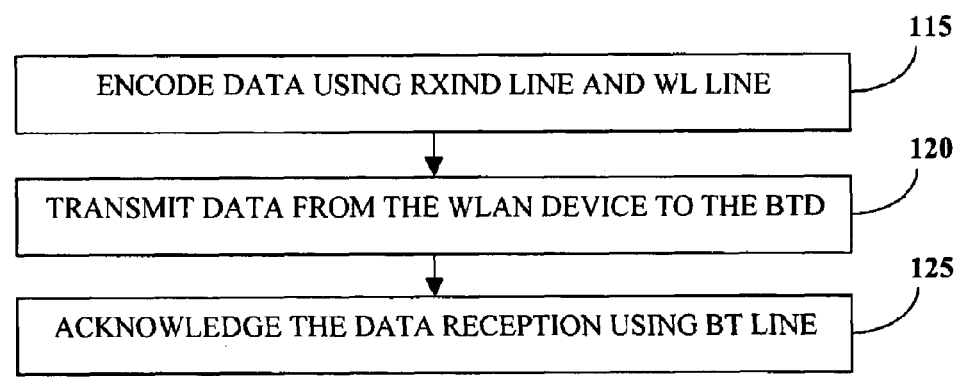
FIG. 1B is a flow diagram illustrating the method of transferring data from the collocated WLAN to the BTD according to an example embodiment of the present invention.

FIG. 1B is a flow diagram illustrating the method of transferring data from the collocated WLAN to the BTD according to an example embodiment of the present invention. The PTA data protocol for transferring data from WLAN device to the BTD is explained as follows. In a step 115, the data is encoded using the RXIND line and WL line. A step 120 transmits the data from the WLAN device to the BTD. In a step 125, the BTD acknowledges the data reception using BT line. The RXIND line and WL line undergoes at least one state transition for each data bit of the data sent to the BTD. After the data bits are sent to the BTD, the WLAN device raises the WL line before the start of next WLAN frame.

Figure 2:
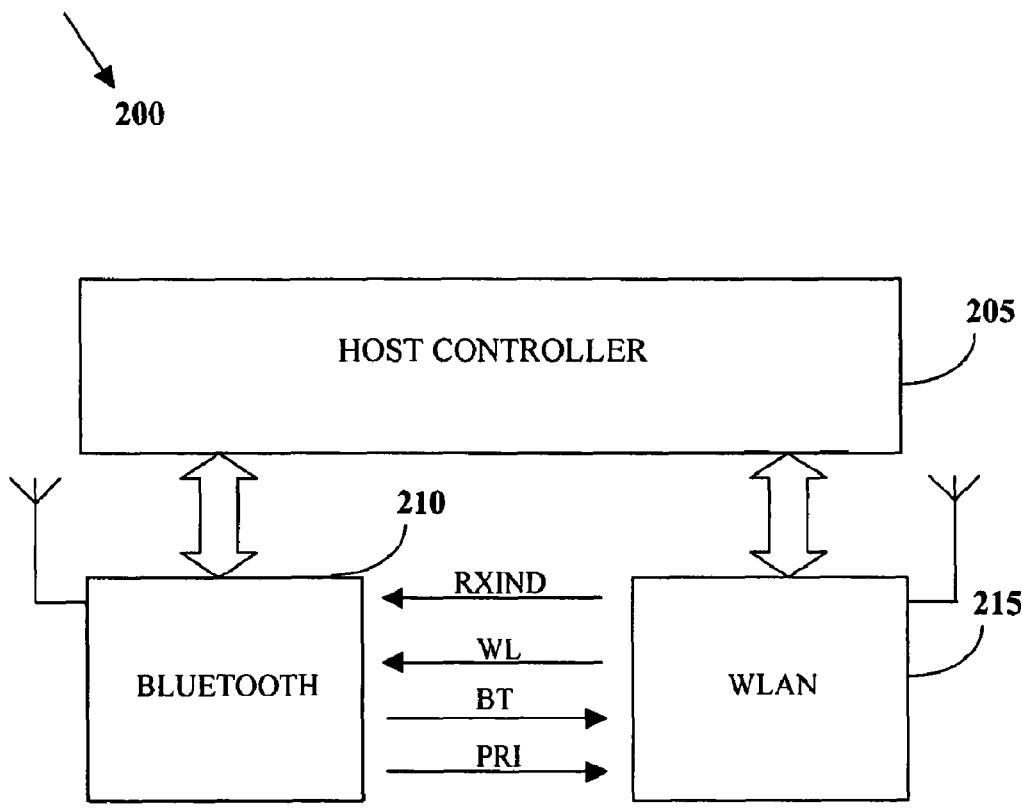
FIG. 2 is a block diagram illustrating the system for transferring data from the collocated WLAN to the BTD according to an example embodiment of the present invention.

FIG. 2 is a block diagram illustrating the system for transferring data from the collocated WLAN to the BTD according to an example embodiment of the present invention 200. The system includes a host controller 205, the BTD 210 and WLAN device 215. There are four control lines between the BTD 210 and WLAN device 215 as an interface. The control lines include RXIND line, WL line, BT line and PRI line. BT line and PRI line goes from BTD 210 to the WLAN device 215 and RXIND line and WL line goes in the opposite direction. The system also includes a data encoding state machine (not shown) for encoding data using the control lines between the BTD 210 and WLAN device 215. The data bits are encoded using the control lines. If data is transmitted from the BTD 210 to the WLAN device 215, PRI line and BT line are used for encoding data. The WLAN device 215 acknowledges the data reception by WL line. If data is transmitted from the WLAN device 215 to the BTD 210, RXIND line and WL line are used for encoding data. The BTD 210 acknowledges the data reception using BT line.

Figure 3:
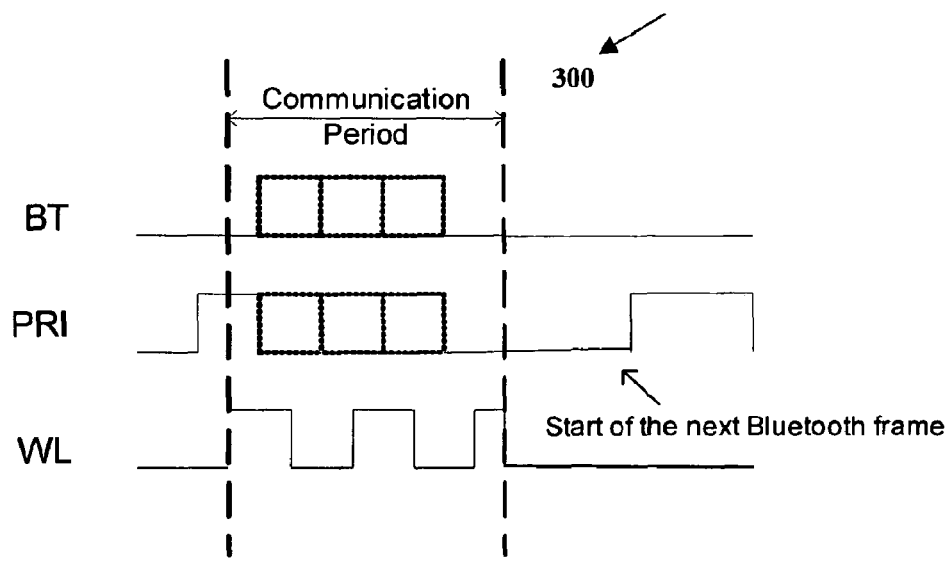
FIG. 3 illustrates the data protocol for transferring data from collocated BTD to the WLAN device.

FIG. 3 illustrates the data protocol for transferring data from collocated BTD to the WLAN device 300. The data bits are encoded using PRI line and BT line. As shown in FIG. 3, the data transfer starts after the PRI line is raised by the BTD and WLAN device has acknowledged the raised PRI line. For each data bit sent to the WLAN device the PRI line and BT line undergoes at least one state transition. After the data bits are sent to the WLAN device, BTD raises the PRI line again after a period of time (time period depends of the time left after the communication period) before the beginning of the next Bluetooth frame (BTD does not raise the PRI line earlier).

Figure 4:
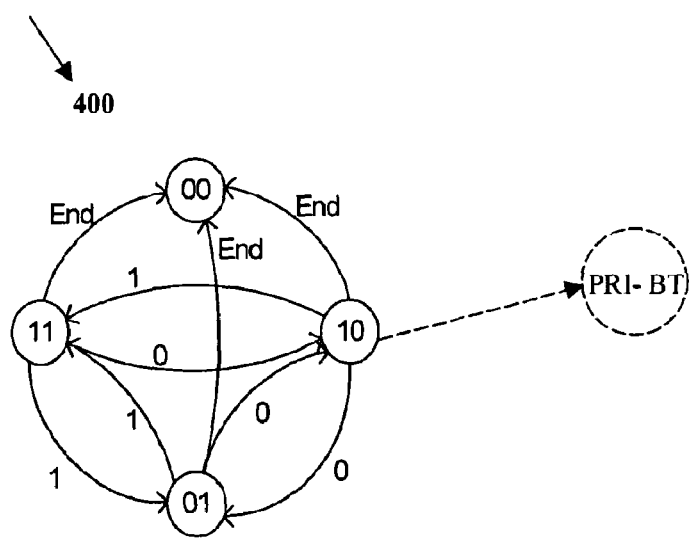
FIG. 4 illustrates the data encoding state diagram for encoding data.

FIG. 4 illustrates the data encoding state diagram for encoding data 400. The first number (on the left side of the circles) indicates the PRI line state and the second number (number on the right side of the circles) indicates the BT line state. This state diagram is applicable to the case where data is transferred from BTD to WLAN device. The communication starts when the PRI line is raised. When the PRI line is raised by BTD, the PRI line state is '1' and BT line state is '0'. So, at the start of the communication the state of PRI line and BT line is '10'. The data transmission is terminated by setting both PRI line and BT line to '0' and WL line has acknowledged the termination.

Figure 5:
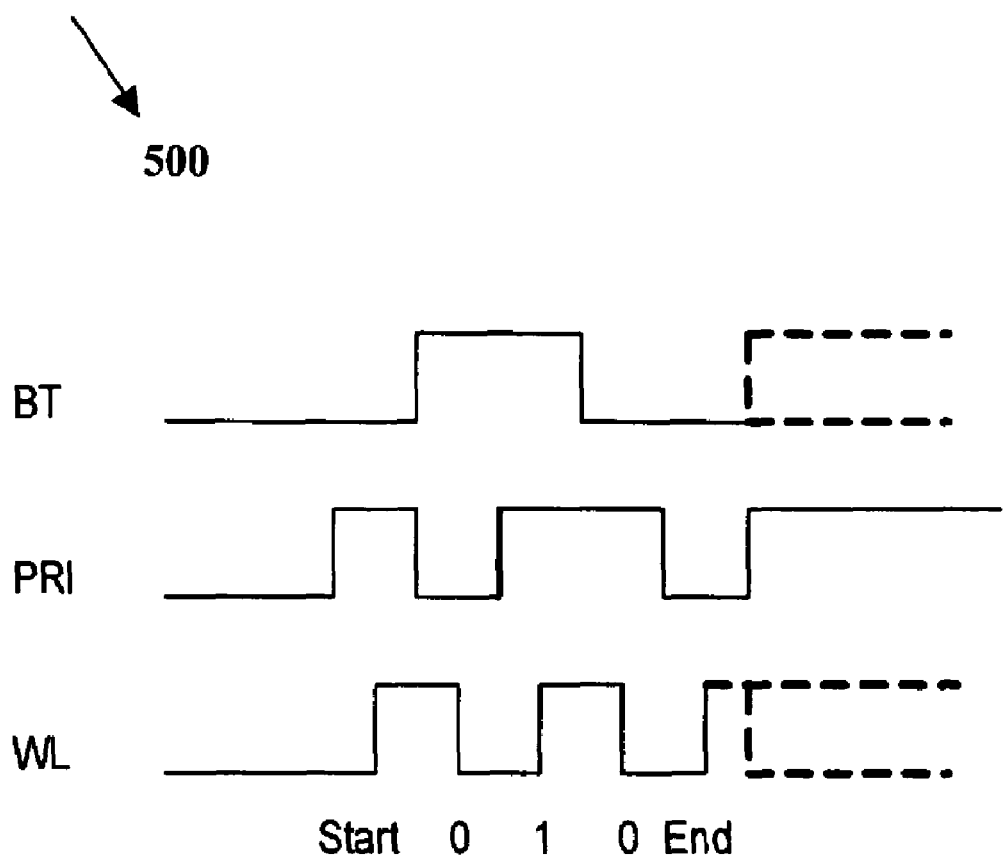
FIG. 5 illustrates an example when BTD transmits the data bits '010' to the WLAN device according to the method of the present invention.

FIG. 5 illustrates an example when BTD transmits the data bits '010' to the WLAN device according to the method of the present invention 500. PRI line is raised by the BTD and data bits are encoded using PRI and BT lines. The data transmission starts after the WLAN device acknowledges the raised PRI line. The BTD transmits the data bits '010' to the WLAN device. For each data bit sent to the WLAN device, the PRI line and BT line undergoes at least one state transition.

Figure 6:
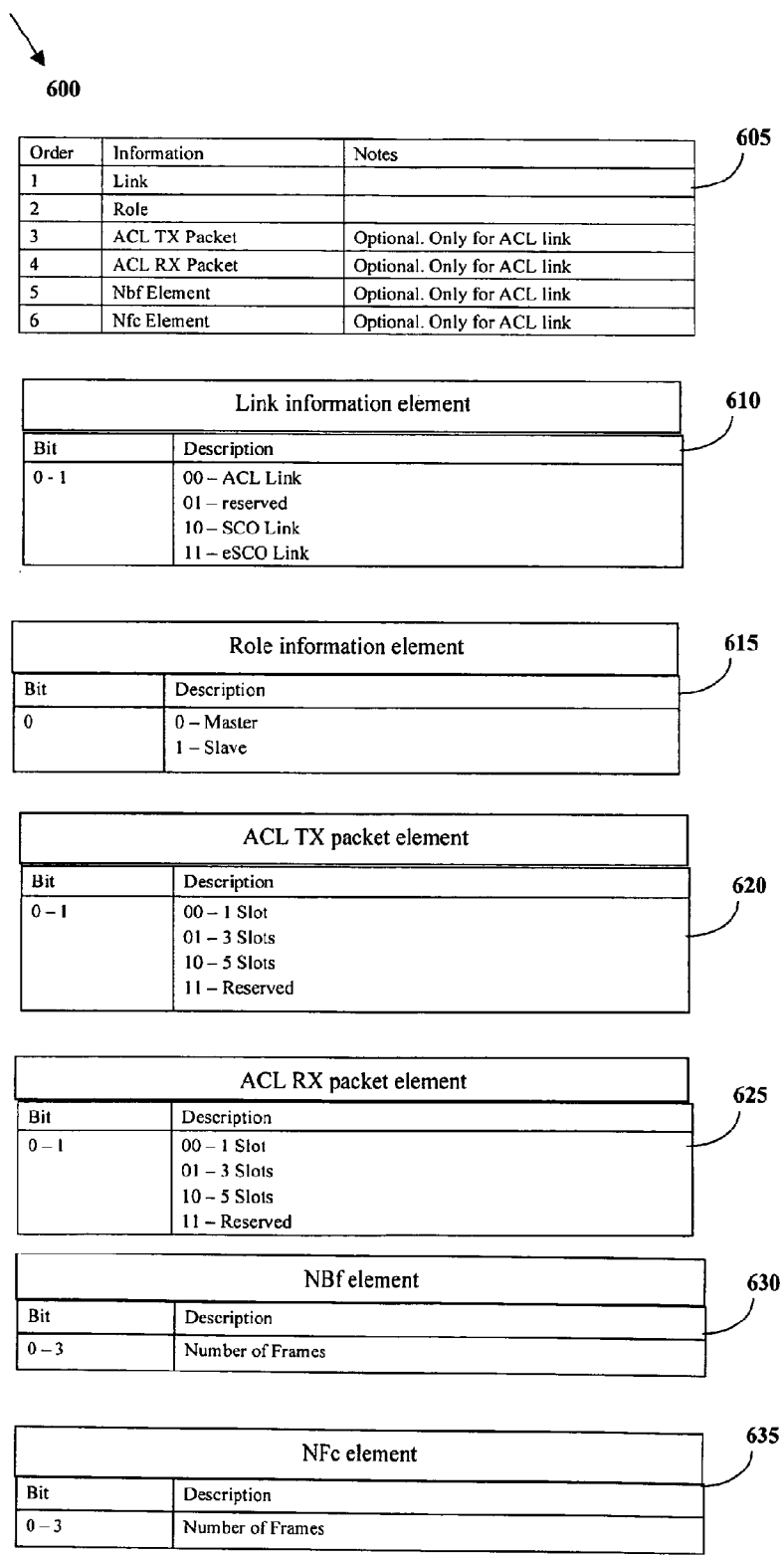
FIG. 6 illustrates the order and description of the information elements in the PTA data protocol.

FIG. 6 illustrates the order and description of the information elements in one embodiment of the PTA data protocol 600. The PTA data protocol is structured so that important information is encoded with few number of data bits and other information is encoded with more number of data bits. Depending on the link information element at the beginning, the different information elements include role information element, asynchronous connection-less (ACL) link transmission packet element, ACL link reception packet element, NBf element and NFc element 605. The description for the link information element is as follows. An ACL link is indicated by '00'. The state '01' is reserved, '10' for synchronous connection oriented (SCO) link and '11' for enhanced synchronous connection oriented (eSCO) link 610.

In the role information element table, '0' indicates a master configuration and '1' indicates a slave configuration 615. In the ACL transmission (ACL TX) packet element, bits '00', '01', '10' indicates one slot, three slots and five slots respectively. The state '11' is reserved 620. In the ACL reception (ACL RX) packet element, bits '00', '01', '10' indicates one slot, three slots and five slots respectively and the state '11' is reserved 625. In the NBf element table and NFc element table, bits 0-3 indicate the number of frames 630, 635.

INDUSTRIAL APPLICATION

The applications of the present invention includes, but not limited to, such as mobile phones or personal digital assistants (PDAs) that use Bluetooth and WLAN in a close proximity.

While the present invention has been described with reference to several particular example embodiments, those skilled in the art will recognize that many changes may be made thereto without departing from the spirit and scope of the present invention, which is set forth in the following claims.

The invention claimed is:

1. A method for transferring data between a collocated Bluetooth device and a wireless local area network device comprising the steps of:
    encoding said data using a plurality of control lines between said Bluetooth device and said wireless local area network device, wherein said plurality of control lines comprise a priority line and a Bluetooth line;
    transmitting the data from the Bluetooth device to the wireless local area network device; and
    acknowledging a data reception by the wireless local area network device using another control line between the Bluetooth device and the wireless local area network device, wherein said another control line in the acknowledging step comprises a wireless local area network line.

2. The method of claim 1, wherein said priority line and said Bluetooth line undergoes at least one state transition for each data bit of the data sent to the wireless local area network device.

3. The method of claim 2, wherein the Bluetooth device raises the priority line before the start of a Bluetooth frame after said data bits are sent to the wireless local area network device.

4. The method of claim 1, whereby the plurality of control lines are used to transmit data and scheduling information from the Bluetooth device to the wireless local area network device.

5. The method of claim 1, wherein the acknowledging the data reception by the wireless local area network device comprises acknowledging that the data from the Bluetooth device has been received by the wireless local area network device.

6. A method for transferring data between a collocated Bluetooth device and a wireless local area network device comprising the steps of:
    encoding said data using a plurality of control lines between said Bluetooth device and said wireless local area network device, wherein said plurality of control lines comprise a wireless local area network receive indicator line and a wireless local area network line;
    transmitting the data from the wireless local area network device to the Bluetooth device; and
    acknowledging a data reception by the Bluetooth device using another control line between the Bluetooth device and the wireless local area network device, wherein said another control line comprises a Bluetooth line.

7. The method of claim 6, wherein said wireless local area network receive indicator line and said wireless local area network line undergoes at least one state transition for each data bit of the data sent to the Bluetooth device.

8. The method of claim 6, whereby the plurality of control lines are used to transmit data and scheduling information from the wireless local area network device to the Bluetooth device.

9. A system for transferring data in wireless communication, said system comprising:
    a Bluetooth device collocated with a wireless local area network device for enabling said wireless communication;
    an interface between said Bluetooth device and said wireless local area network device, wherein said interface comprising a plurality of control lines between the Bluetooth device and wireless local area network device, and wherein the plurality of control lines comprises a control line for acknowledging a data reception between the Bluetooth device and the wireless local area network device; and
    a data encoding state machine for encoding and transmitting said data using said plurality of control lines between the Bluetooth device and wireless local area network device.

10. The system of claim 9, wherein the plurality of control lines comprise a Bluetooth line, a wireless local area network line, a wireless local area network receive indicator line, and a priority line.

11. The system of claim 10, wherein the plurality of control lines used for encoding if data is transmitted from the Bluetooth device to the wireless local area network device include said priority line and said Bluetooth line.

12. The system of claim 10, wherein the plurality of control lines used for encoding if data is transmitted from the wireless local area network device to the Bluetooth device include said wireless local area network line and said wireless local area network receive indicator line.

13. The system of claim 10, wherein said control line used for acknowledging the data reception from the wireless local area network device includes the wireless local area network line.

14. The system of claim 10, wherein the control line used for acknowledging the data reception from the Bluetooth device includes the Bluetooth line.

15. The system of claim 8, whereby the plurality of control lines are used to transfer data and scheduling information between the Bluetooth device and the wireless local area network device.

16. The system of claim 9, wherein the control line is configured to acknowledge that a first data from the Bluetooth device has been received by the wireless local area network device or that a second data from the wireless local area network device has been received by the Bluetooth device.

\* \* \* \* \*